United States Patent

Fitch et al.

[15] 3,642,068
[45] Feb. 15, 1972

[54] FORMATION FRACTURING

[72] Inventors: John L. Fitch; Thomas C. Vogt, Jr., both of Dallas, Tex.

[73] Assignee: Mobil Oil Corporation

[22] Filed: Mar. 21, 1968

[21] Appl. No.: 715,071

[52] U.S. Cl....................................................166/307, 166/308
[51] Int. Cl..............................................................E21b 43/27
[58] Field of Search.......................166/42.1, 280, 308, 307

[56] References Cited

UNITED STATES PATENTS

| Re.23,733 | 11/1953 | Farris.................................166/42.1 |
| 2,859,821 | 11/1958 | Trott..................................166/42.1 |
| 2,950,247 | 8/1960 | McGuire et al...................166/42.1 X |
| 3,285,340 | 11/1966 | Huitt et al..........................166/42.1 |
| 3,349,851 | 10/1967 | Huitt et al..........................166/42.1 |

*Primary Examiner*—Ian A. Calvert
*Attorney*—William J. Scherback, Frederick E. Dumoulin, William D. Jackson, Donald L. Dickerson and Sidney A. Johnson

[57] ABSTRACT

This specification discloses a fracturing process in which a fracture formed in a formation is acid etched near the well and particle propped in the more remote portions of the fracture. A fracture is formed in the formation extending from the well and an acidizing fluid is injected into the fracture in order to acid etch the walls thereof adjacent the well. A carrier fluid containing propping agent is injected into the fracture. Subsequent to injection of the propping agent, a displacing fluid is injected into the fracture. The displacing fluid is introduced under conditions such that it displaces the previously injected propping agent away from the well into the more remote portions of the fracture. The displacing fluid may have a lower viscosity than the carrier fluid and may be injected at a greater rate than the carrier fluid.

1 Claims, 1 Drawing Figure

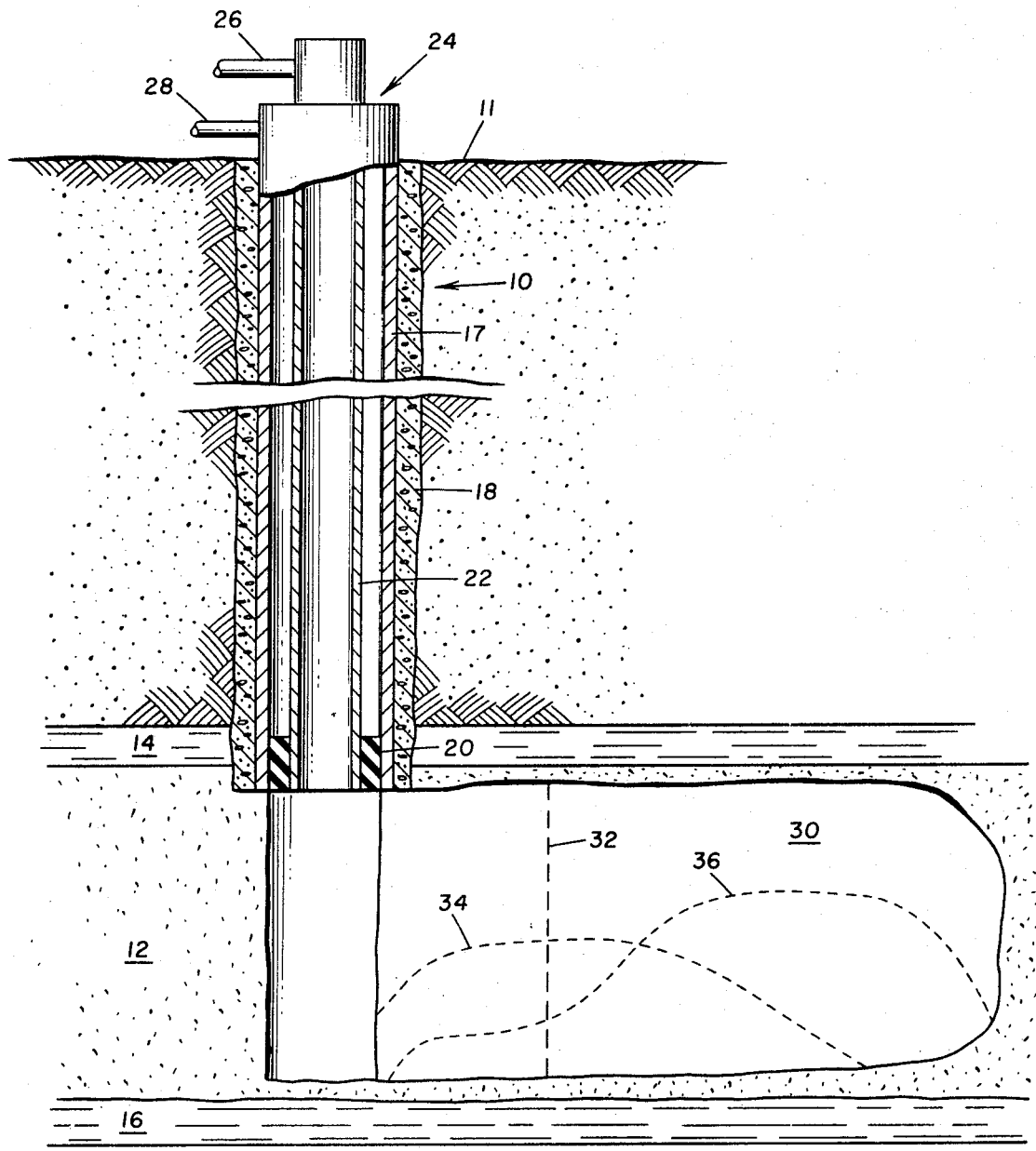
JOHN L. FITCH
THOMAS C. VOGT, JR.
INVENTORS
BY *William V. Jackson*
ATTORNEY

3,642,068

FORMATION FRACTURING

BACKGROUND OF THE INVENTION

This invention relates to the treatment of subterranean formations in order to increase the permeability thereof and, more particularly, to a new and improved hydraulic fracturing technique in which acid etching is employed in combination with the use of propping agents.

It is oftentimes desirable to treat subterranean formations in order to increase the permeability thereof. For example, in the oil industry it is conventional to hydraulically fracture a well in order to produce one or more fractures in the surrounding formation and thus facilitate the flow of oil and/or gas into the well or the injection of fluids such as gas or water from the well into the formation. Such hydraulic fracturing is accomplished by disposing a suitable fracturing fluid within the well opposite the formation to be treated. Thereafter, sufficient pressure is applied to the fracturing fluid in order to cause the formation to break down with the attendant formation of one or more fractures therein. Simultaneously with or subsequent to the formation of the fracture a suitable carrier fluid having suspended therein a propping agent such as sand or other particulate material is introduced into the fracture. The propping agent is deposited in the fracture and functions to hold the fracture open after the fluid pressure is released. Typically, the fluid containing the propping agent is of a relatively high viscosity in order to reduce the tendency of the propping agent to settle out of the fluid as it is injected down the well and into the fracture. In most instances, particularly in relatively deep formations, the fracture or fractures produced by hydraulic fracturing tend to be oriented in a predominantly vertical direction.

Another common procedure for increasing formation permeability is a well acidizing technique, commonly termed "acid etching" in which a suitable acid, such as hydrochloric, formic, or acetic acid in carbonate formations, or hydrofluoric or fluophosphoric acid in siliceous formations, is injected into the well under sufficient pressure to force it into the adjacent subterranean formation. Acid-soluble material in the formation is attacked and dissolved thereby enlarging the interstices of the formation adjacent the well with an attendant increase in permeability. In some instances acidizing is employed in conjunction with hydraulic fracturing. Thus, an acidizing fluid may be injected into the well and sufficient pressure exerted thereon in order to cause the formation to break down to produce a fracture therein as in the hydraulic fracturing technique described above. In this case, the acidizing fluid may contain a propping agent which functions to prop the fracture open. At the same time the acid acts on the walls of the fracture to enlarge the fracture, thus further increasing the permeability of the formation.

SUMMARY OF THE INVENTION

In accordance with the present invention, there is provided a new and improved hydraulic fracturing and acidizing technique in which a fracture is acid-etched in a relatively limited area near the well and particle propped in the more remote areas of the fracture with a relatively low propping agent concentration in the acid-etched portion of the fracture. In carrying out the invention a well penetrating a subterranean formation is treated in order to form a fracture in the formation extending from the well. An acidizing fluid is injected into the fracture in order to acid etch the walls of the fracture adjacent the well thus enlarging the fracture in this portion of the formation. A carrier fluid containing a propping agent is injected into the fracture in order to deposit the propping agent therein as in conventional fracturing techniques. Subsequent to the deposition of the propping agent within the fracture a displacing fluid having relatively little or no propping agent therein is injected into the fracture. This displacing fluid comprises the previously mentioned acidizing fluid and is injected at a rate greater than the carrier fluid in order to displace previously injected propping agent away from the well into the more remote portions of the fracture. Thus, the propping agent concentration in the fracture is reduced in the acid-etched portion thereof adjacent the well with the result that a high fracture conductivity is provided next adjacent the well.

BRIEF DESCRIPTION OF THE DRAWING

The drawing is an illustration, partly in section, of a well penetrating a subterranean formation and showing a vertical fracture formed in accordance with the present invention.

DESCRIPTION OF SPECIFIC EMBODIMENTS

In the drawing there is illustrated a well 10 which extends from the earth's surface 11 and penetrates a subterranean formation which may be productive of oil and/or gas. The formation 12 is bordered by upper and lower formations 14 and 16, respectively. The formations 14 and 16 are relatively impermeable and typically will take the form of shale beds. The well 10 is provided with a casing string 17 which extends into the formation 12 and is cemented within the well as indicated by reference numeral 18. The well also may be provided with a packer 20 which isolates the formation 12 from the upper portion of the well and a tubing string 22 which extends from the surface 24 of the well through the packer 20. Flowlines 26 and 28 are provided for the tubing and casing, respectively, for introduction and withdrawal of fluids. It will be understood that the well structure thus far described is exemplary only in that the well may be completed by other suitable techniques. For example, rather than the "open hole" completion illustrated, the well may be cased and cemented to total depth and the casing then perforated opposite the formation 12 in order to provide an open interval to the formation.

The formation 12 may be a calcareous formation such as a limestone or dolomite in which case a carbonate reactive acid such as hydrochloric or acetic acid will be used in practicing the invention. Alternatively, the formation 12 may be considered to be a siliceous formation such as a sandstone in which case a silica reactive acid such as hydrofluoric or fluophosphoric may be used. In any case it will be understood that by the term "acidizing fluid," as used herein and in the appended claims, is meant an acid which is reactive with material contained in the formation. In those cases where silica reactive acids are used, the use of sand or other propping agents which are dissolved by such acids should, of course, be avoided where appropriate.

In accordance with the present invention, the formation 12 is hydraulically fractured in order to form one or more fractures such as the vertical fracture indicated by reference numeral 30. That portion of the fracture adjacent the well is acid etched in order to provide high fracture conductivity near the well where it is most beneficial. In addition, a relatively low concentration of propping agent is deposited in the acid-etched portion of the fracture and the fracture is provided with a relatively high concentration of propping agent at greater distances from the wellbore where acid etching is often difficult or even impossible to achieve. Thus, there is provided a technique whereby the fracture is held open with a suitable propping agent at relatively great distances from the well but wherein the provision of excess propping agent near the well is avoided, thus avoiding a reduction in fracture conductivity normally associated with high propping agent concentration.

As a first step in carrying out the invention, the formation is hydraulically fractured in order to form one or more fractures extending into the formation 12 from the well 10. This is accomplished by introducing a suitable fracturing fluid into the well and adjacent the formation 12 via the tubing string 22. As the fracturing fluid first reaches the zone of the well adjacent the formation 12, it initially will tend to remain in the well and thus build up a high pressure on the face of the formation due to the inability of the fracturing fluid to penetrate the formation at the rate at which it is being introduced into the well. As pumping of the fracturing fluid into the well continues the pressure imposed by the fluid on the face of the formation ultimately reaches the so-called "formation breakdown pressure" and one or more fractures such as that indicated by reference numeral 30 are formed.

The initiation of a fracture in the formation usually is accompanied by a relatively abrupt and substantial decrease in pressure. Thereafter, the pressure will remain relatively constant as the fracture is extended deeper into the formation by the continued injection of fracturing fluid into the well. The formation breakdown pressure, i.e., the pressure at which the fracture or fractures are initially formed and at which the aforementioned pressure drop occurs in pounds per square inch, is usually within the range of about one-half to one times the depth of the formation in feet. This pressure, however, may vary widely depending upon the depth and nature of the formation, the type of fractures formed, e.g., horizontal or vertical, and the presence of already existing natural fractures in the formation.

In most instances the fracture or fractures formed will tend to be naturally oriented in a generally vertical direction as shown in the drawing. This is particularly true in formations at depths on the order of about 3,000 feet or more since in such cases the so-called overburden pressure will usually exceed the horizontal stress characteristics and strength of the formation.

The fracturing fluid used in this step may be of any suitable type, as will be understood by those skilled in the art. Preferably, however, the fracture will be initiated by an acidizing fluid such as hydrochloric acid which contains little or no propping agent. At least the first portion of the acidizing fluid should be of a relatively low viscosity in order to secure good initial penetration into the formation. The remainder may be thickened and may include a suitable fluid loss additive. The use of an acidizing fluid in this phase of the invention is especially beneficial since the acid will immediately react with the walls of the fracture, thus enlarging the fracture adjacent the well. This will allow subsequently injected propping agent to pass more readily through the enlarged portion of the fracture near the well and into the more remote portions of the fracture.

Regardless of the amount of acidizing fluid injected during this and/or subsequent steps of the invention, it normally will result in acid etching of only a limited portion of the fracture 30. In this regard, the acid will react relatively rapidly with the formation such that it will penetrate to only a limited depth before becoming spent. This effect is especially pronounced in carbonate formations. For example, in the fracturing of a limestone formation with a 15 percent hydrochloric acid solution, the spending time of the acid normally will be such as to limit acid etching to the first 50 feet next adjacent to the well and usually to about the first 20 feet. In the drawing, the acid-etched portion of fracture 30 is indicated as being between the well 10 and broken line 32. It is to be recognized that the drawing is highly schematized. Thus, while, as indicated, acid etching usually will be limited to about the first 20 feet of the fracture, the total fracture may extend into the formation for a distance of 200 feet or more.

After initiation of the fracture a fluid suspension of a suitable propping agent is injected into the fracture. The fluid utilized in carrying the propping agent into the fracture desirably is a viscosified fluid capable of retaining the particulate propping agent in suspension as it is carried down the well and into the fracture. Usually, the carrier liquid for the propping agent will be an inert, i.e., substantially acid-free, liquid such as water, lease crude oil, diesel oil, etc. However, acidizing fluid containing suitable viscosifying agents may be used as a carrier fluid. For example, a 15 percent aqueous hydrochloric acid solution containing natural gums as a viscosifying agent may be used as the carrier fluid. The viscosity of the thickened acid solution typically will be on the order of about 10 to 70 centipoises. Where an acid is used to carry propping agent, it usually will be preferred to utilize an inert liquid as a predominant portion of the carrier fluid in order to avoid using an excessive amount of acid.

Departing briefly from the description of the invention, it is well known in the art that a propping agent, as it enters a fracture in its respective carrier fluid, tends to settle out of the carrier fluid to the bottom of the fracture. This effect is particularly pronounced in predominantly vertical fractures. Thus, as disclosed by Kern et al., "The Mechanics of Sand Movement In Fracturing," PETROLEUM TRANSACTIONS, AIME, Vol. 216, p. 403 (1959), when the velocity of a sand-fluid suspension moving through a vertical fracture is less than a certain "equilibrium velocity," estimated to be about 5 to 10 feet per second or more for relatively low viscosity oil or water, most of the injected sand will settle to the lower boundary of the fracture. Such settling will continue until enough of the fracture area originally open to fluid flow is blocked by the sand to cause the fluid velocity to increase to the equilibrium velocity. When the fluid injection rate is above this equilibrium velocity some of the sand previously deposited in the bottom of the fracture is washed out by the injected fluid and displaced deeper into the fracture at the more remote locations from the well. As disclosed by Kern et al., this critical velocity is dependent upon a number of factors including the sand injection rate and the viscosity of the fluid. More particularly, the equilibrium velocity decreases with a decrease in sand injection rate and also with a decrease in viscosity of the fluid.

In view of the above discussion, it will be recognized that propping agent will settle out of the carrier fluid as it moves through the fracture 30. As injection of carrier fluid and propping agent continues, the propping agent deposited in the fracture will assume a concentration such as is indicated in ordinate in the drawing by broken line 34. As shown in the drawing, a high concentration of propping agent will occur in the acid-etched portion of the fracture. Depending upon the amount of propping agent injected and the conditions of injection, the deposited propping agent may extend into the unetched portions of the fracture. However, the propping agent will seldom, if ever, reach the outer extremity of the fracture.

Subsequent to the injection of propping agent into the fracture 30, a displacing fluid is injected into the fracture in order to displace the previously injected propping agent away from the well into the more remote portions of the fracture, thus reducing the propping agent concentration in the acid-etched portion of the fracture adjacent the well and increasing such concentration in the more remote portions of the fracture as indicated in ordinate by broken line 36. This result may be achieved in a number of ways. For example, if the subsequently injected displacing fluid is substantially free of propping agent, the injection of this fluid into a fracture even at low velocities will result in the displacement of some previously deposited propping agent to a location in the fracture more remote with respect to the well. Also, even if the displacing fluid contains propping agent, the injection of the fluid at a substantially higher rate than that achieved during the injection of the carrier fluid would likewise result in the net displacement of some propping agent deeper into the formation. In addition, the displacing fluid may be of a lower viscosity than the previously injected carrier fluid, thus resulting in a lower equilibrium velocity in the fracture system as described above.

One or more of the above-mentioned factors may be utilized to advantage in carrying out the present invention. A basic requirement of the invention is that the subsequently injected displacing fluid have a lower propping agent concentration than the previously injected carrier fluid. In most cases it will be preferred that the displacing fluid be substantially free of propping agent. In addition, it is preferred to utilize as the displacing fluid a liquid having a lower viscosity than the carrier fluid. Thus, if the carrier fluid is a gelled aqueous liquid exhibiting a viscosity on the order of about 30 centipoises, the displacing fluid may be untreated water which exhibits a viscosity of about 1 centipoise. In addition, it will be preferred to inject the displacing fluid into the fracture at a rate greater than the injection rate of the carrier fluid.

The displacing fluid may be an inert liquid such as water or crude oil or it may be an acidizing fluid. In the invention claimed herein, the displacing fluid comprises an acidizing fluid. The use of an acidizing fluid in this phase of the invention is advantageous where it is desirable to obtain relatively deep acid penetration. In this regard, the presence of a relatively high concentration of propping agent in the fracture adjacent the well will result in an increased velocity of fluid flow through the fracture for any given injection rate. Thus, for a given spending time of the injected acid, the acid-etched zone of the fracture will be increased.

To recapitulate briefly, in the preferred embodiment of the invention described, the fracture is initiated with a relatively low-viscosity acidizing fluid, e.g., an ungelled hydrochloric acid solution. Thereafter, a high-viscosity fluid having propping agents suspended therein is injected in order to carry the propping agent into the fracture and also to extend the fracture. A displacing liquid then is injected in order to displace the propping agent further out into the fracture. It is, of course, necessary that the displacing fluid be injected into the fracture subsequent to the carrier fluid. However, in accordance with the broad aspect of the invention, the other relationships between the injected fluids may be varied. For example, the fracture may be initiated with an inert fluid which may or may not contain propping agent. Also, while it is preferred that the carrier fluid and propping agent be preceded by an acidizing fluid, the sole injection of acidizing fluid may be as the carrier fluid, as the displacing fluid, or as a last step in carrying out the invention subsequent to injection of the displacing fluid. As noted previously, in the invention claimed herein the displacing fluid comprises an acidizing fluid notwithstanding that an acidizing fluid may be employed in the other steps also.

As a hypothetical example of the present invention, it is assumed that it is desired to fracture a limestone formation at a depth of 6,500 feet and having a thickness of 150 feet and a temperature of 150° F. It further is assumed that a single vertical fracture is formed which exhibits a penetration depth of about 260 feet, a height of 150 feet (the same as the thickness of the formation) and a width of about 0.07 inch.

As a first step in initiating the fracture, two barrels of a 15 percent hydrochloric acid solution are injected into the well and allowed to stand for a short time, e.g., less than one-half hour. Thereafter, approximately 10 barrels of thickened (viscosity of about 9 centipoises) 15 percent hydrochloric acid containing a fluid loss additive and a suitable viscosity modifier are injected at a rate of 23 barrels per minute. The spending time of the acid at the formation temperature of 150° F. is about 0.03 minutes and the distance of live acid penetration is about 22 feet.

The thickened hydrochloric acid is followed immediately with 430 barrels of 30° API crude oil (viscosity of about 9 centipoises) containing a fluid loss additive and viscosity modifier and having a propping agent suspended therein in a concentration of about 77 pounds of 20–40 mesh Ottawa sand per barrel. The injection rate of the carrier fluid is 23 barrels per minute. The height of the sand bed within the fracture at the conclusion of the carrier fluid injection step is about 75 feet, leaving an open fracture interval above the sand bed of a height of 75 feet.

Next, displacing fluid which is free of propping agent is injected in order to reduce the propping agent concentration within the etched zone of the fracture. Assuming that it is desired to reduce the sand bed height within the etched zone to 50 feet, a displacing fluid of 30° API crude oil (viscosity of about 2 centipoises) containing a suitable fluid loss additive but no viscosity modifier is injected at a rate of 25 barrels per minute. The displacing fluid is injected in an amount of at least 80 percent of the fracture volume contained within the etched faces. Thus, assuming the first 22 feet of fracture is acid etched as described above, the displacing fluid is injected in an amount of at least eight barrels. After injection of the displacing fluid, the well is swabbed or placed on production in order to produce the injected fluids back into the wellbore.

Having described specific embodiments of the instant invention, it will be understood that further modifications thereof may be suggested to those skilled in the art, and it is intended to cover all such modifications as fall within the scope of the appended claims.

What is claimed is:
1. In a method of fracturing a subterranean formation penetrated by a well, the steps comprising:
    a. forming a fracture in said formation extending from said well;
    b. injecting into said fracture a carrier fluid containing a propping agent; and
    c. subsequent to step (b) injecting into said fracture a displacing fluid comprising an acidizing fluid to acid etch the walls of said fracture adjacent said well, said displacing fluid being injected at a greater rate than the carrier fluid injected in step (b) and having a lower propping agent concentration than said fluid specified in step (b) to displace previously injected propping agent away from said well whereby the propping agent concentration is reduced in the acid-etched portion of said fracture adjacent said well.

* * * * *